United States Patent [19]
Waligorski et al.

[11] 3,931,949
[45] Jan. 13, 1976

[54] SECURITY PEDESTAL BASE

[76] Inventors: Gordon J. Waligorski, 4713 Nottinghamshire Drive, Louisville, Ky. 40299; Roy F. McMahan, Sr., 2950 Breckinridge Lane, Louisville, Ky. 40220

[22] Filed: Oct. 2, 1974

[21] Appl. No.: 511,177

[52] U.S. Cl. ............................ 248/418; 108/142
[51] Int. Cl.² ...................................... F16M 13/00
[58] Field of Search ............... 108/139, 142, 150; 109/50–52; 248/158, 159, 415–418, 203, 349; 312/7 TV, 254

[56] References Cited
UNITED STATES PATENTS

| | | | |
|---|---|---|---|
| 2,024,330 | 12/1935 | Bemis | 248/158 |
| 2,872,006 | 2/1959 | Payne et al. | 248/203 X |
| 3,067,976 | 12/1962 | Popowitz | 248/349 |
| 3,291,432 | 12/1966 | Lucasey | 248/203 X |
| 3,667,405 | 6/1972 | Roach | 109/51 |
| 3,724,798 | 4/1973 | Lucasey | 248/418 |
| 3,801,055 | 4/1974 | Stenger | 248/203 X |

FOREIGN PATENTS OR APPLICATIONS

| | | | |
|---|---|---|---|
| 728,006 | 11/1942 | Germany | 108/139 |

*Primary Examiner*—Roy D. Frazier
*Assistant Examiner*—Lawrence J. Staab
*Attorney, Agent, or Firm*—Dominik, Knechtel, Godula & Demeur

[57] ABSTRACT

A security pedestal base is disclosed which includes a base, an upstanding support mounted on said base and wherein the upstanding support is substantially hollow, a support shaft positioned concentrically within said upstanding support and mounted on said base and upstanding therefrom, support platform means mounted on the top portion of said upstanding support and interconnected with said support shaft, a sleeve member rotatably positioned about the support shaft and adapted to be rotatably movable when contact is made with any cutting instrument, and a decorative slip-on column which overlies the upstanding support and positioned in overlying relationship with respect to the base and wherein the support platform overlies the decorative slip-on column. The support platform is further provided with a concealing shield such that the connection of the support platform to the support shaft is concealed from access by any unauthorized person.

9 Claims, 8 Drawing Figures

U.S. Patent  Jan. 13, 1976  Sheet 1 of 4  3,931,949
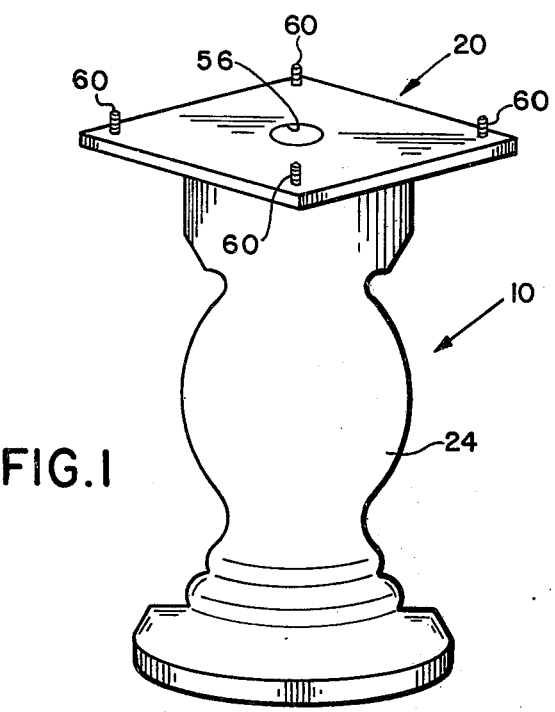
FIG.1
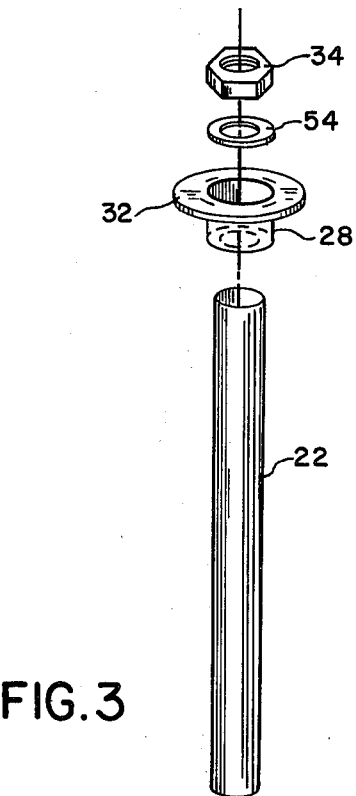
FIG.3
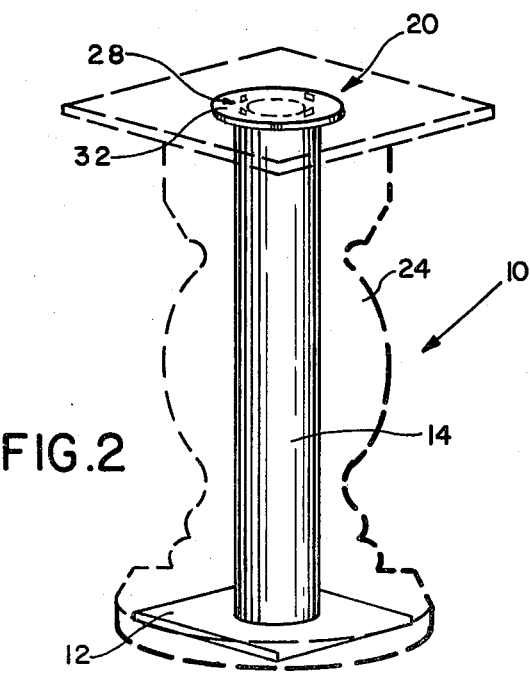
FIG.2
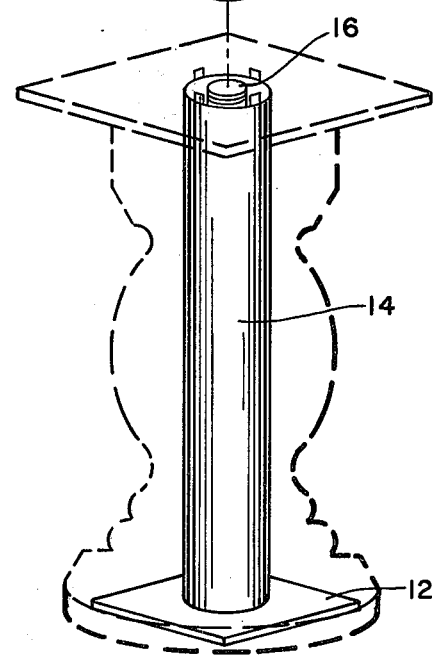

SECURITY PEDESTAL BASE

BACKGROUND OF THE INVENTION

The proliferation of a variety of commercial institutions such as motels, hotels and other such facilities has brought about an increase in the number of products and services utilized in connection with such facilities. More specifically, it is well known that in the newer hotels, motels and other such institutions, individual room facilities are generally provided with television sets, or other equipment of significant value. Generally, these items are provided for the benefit of the guests of these facilities, and it is generally intended that items such as televisions, radios or other such items provided in individual room facilities have a useful life of no less than two years.

It is well known that in connection with items such as television sets provided in motel and hotel rooms that the incidence of theft has become a serious concern to the proprietors of such institutions. For this reason, a variety of tamper proof devices have been designed whereby an item such as a television set may be securedly installed in the facility minimizing and/or preventing unauthorized removal. In spite of these efforts, the incidence of theft or other unauthorized removal has remained quite high due to the fact that very few structures have been designed to prevent or minimize such unauthorized removal.

It is especially desirable to provide a pedestal base assembly in connection with a television set which may be easily and conveniently installed within an individual room facility in a hotel or motel which provides both ease of use by the operator as well as a high level of security to prevent theft or other unauthorized removal. These structures are particularly desirable where the pedestal base provides a rotatable platform upon which the television set may be supported such that the room guest may view the television set from any strategic location within the room facility. However, it has been found that pedestal bases having rotatable support platforms are generally not tamper proof since access to the point of attachment of the support platform to the underlying column is accessible to any person in the room. Hence, it has been found that such pedestal bases are amenable to removal of the support platform merely by cutting through the column either below the support platform or at the point at which the platform is rotatably mounted to the column. In point of fact, it has been found that the most common manner of unauthorized removal has been by cutting through the column with a cutting instrument such as a hacksaw thereby removing the television set even though the same may be fixedly secured to a support platform therebelow.

Various attempts have been made in the patented art to provide tamper proof or security type television supports as exemplified by U.S. Pat. No. 3,559,942, which is directed to anti-theft t.v. support. However, it will be noted that the system proposed in the aforementioned patent is basically a wall mounted system and can be tampered with to remove the t.v. set by the use of any cutting instrument such as a hacksaw.

Similarly, U.S. Pat. No. 3,067,976 represents another attempt at providing a theft-proof t.v. swival arrangement, but it is believed that the structure as depicted in the aforementioned patent still does not prevent unauthorized removal by cutting through the assembly by an appropriate cutting instrument.

SUMMARY OF THE INVENTION

The present invention is designed to provide a pedestal base-type television support which is both decorative in appearance, easy to operate, and provides a high degree of security both in connection with the pedestal, as well as with the rotatable platform mounted thereatop. Briefly, the invention provides a pedestal base for a television set which includes an underlying base which is designed to be permanently and fixedly secured to the underlying support surface, such as a concrete floor, an upstanding support mounted on the base having a hollow interior, a support shaft mounted interiorly of the upstanding support and in the preferred embodiment, having a lower mounting portion which may be mounted directly into the underlying support surface, a sleeve member freely rotatably mounted about the support shaft and wherein the inner diameter of the sleeve member is slightly greater than the outer diameter of the support shaft, and a support platform assembly which is mounted to the support shaft but rotatable with respect to the support shaft as well as the upstanding support and wherein the rotatable mounting of the support platform to the support shaft is concealed by means of a shield thereby shielding access to the rotatable mounting from any unauthorized personnel. In addition, the support platform is provided with apertures having recesses therein to accomodate the provision of tamper proof screws for fixedly securing the television set directly to the support platform.

OBJECTS AND ADVANTAGES

Given the drawbacks as set forth above with respect to the prior art, it is the principal object of this invention to provide a pedestal base assembly specifically adapted to support an apparatus such as a television receiver thereatop which provides a high degree of security against unauthorized removal by theft or otherwise, which is also decorative in visual appearance.

Another object of the invention is to provide a pedestal base of the type described above, which is formed by a base, an upstanding support mounted on said base and having a hollow interior, a support shaft positioned concentrically within the hollow of the upstanding support, support platform means rotatably mounted at the upper end of the support shaft, a sleeve member rotatably positioned about the support shaft internally of the upstanding support and designed to rotate freely when contacted by any cutting element, and wherein the support platform means includes a shield depending from the lower surface thereof thereby to conceal access to the point of the rotatable mounting of the support platform means to the support shaft.

In connection with the foregoing object, it is still another object of this invention to provide a pedestal base of the type described wherein a decorative slip-on column is provided which is interposed between the base of the pedestal and the support platform means thereof and wherein the decorative slip-on column includes a hollow center portion thereby to totally surround the upstanding support and be locked in position between the base and the support platform means.

Still another object of this invention is to provide a pedestal base assembly of the type described wherein the support platform means includes a support platform fixedly secured to a circumferential shield extending downwardly therefrom and the upper end of the upstanding support includes a cup plate securely mounted to the support shaft and overriding the upstanding support whereby the support platform rotatably moves about the circumferential portion of the flange portion of the cup plate while the depending circumferential shield conceals access to the cup plate and the mounting point of the cup plate to the support shaft.

In connection with the foregoing object, it is still another object of this invention to provide a pedestal base of the type described wherein the support platform further includes a plurality of apertures positioned around the outer periphery of the support platform, and wherein the apertures include recesses to accomodate the positioning therethrough of tamper proof screws which are designed to screw threadedly mount into a television receiver or other apparatus carried on the support platform, and wherein the tamper proof screws include screw heads which are nestled within the recesses of the apertures, such that a high degree of security is provided for the mounting of the television receiver onto the support platform as well as providing security for the point of attachment of the support platform to the support shaft, and further providing a high level of security in connection with the provision of the rotatable sleeve member around the support shaft.

Further features of the invention pertain to the particular arrangement of the elements and parts whereby the above-outlined and additional operating features thereof are attained.

The invention, both as to its organization and method of operation, together with further objects and advantages thereof will best be understood by reference to the following specification taken in connection with the accompanying drawings in which:

FIG. 1 is a perspective view of the subject pedestal base having the decorative slip-on column positioned thereon and showing the support platform to accomodate the mounting of a television receiver thereatop;

FIG. 2 is a perspective view, partly in phantom, showing the relationship between the decorative slip-on cover and the interiorly positioned upstanding support as mounted on the underlying base, and having the support platform secured thereatop;

FIG. 3 is a perspective view, partly in phantom, and exploded, showing the relationship between the decorative slip-on column, the upstanding support as mounted on the base, and the rotatable sleeve member positioned about the interior support shaft, and the circumferential shield shielding access to the point of rotatable mounting of the support platform with respect to the support shaft;

Figure 6:
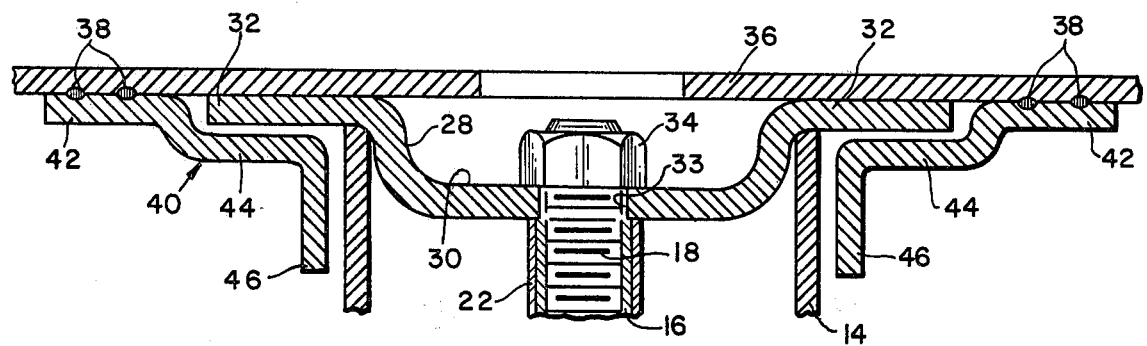
Figure 7:
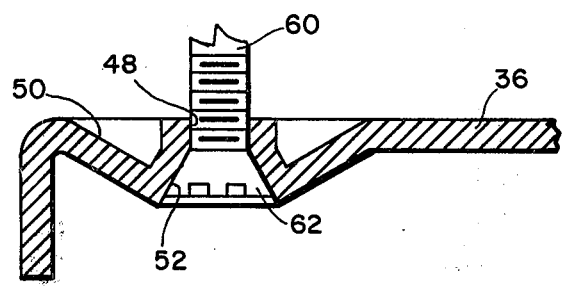
Figure 8:
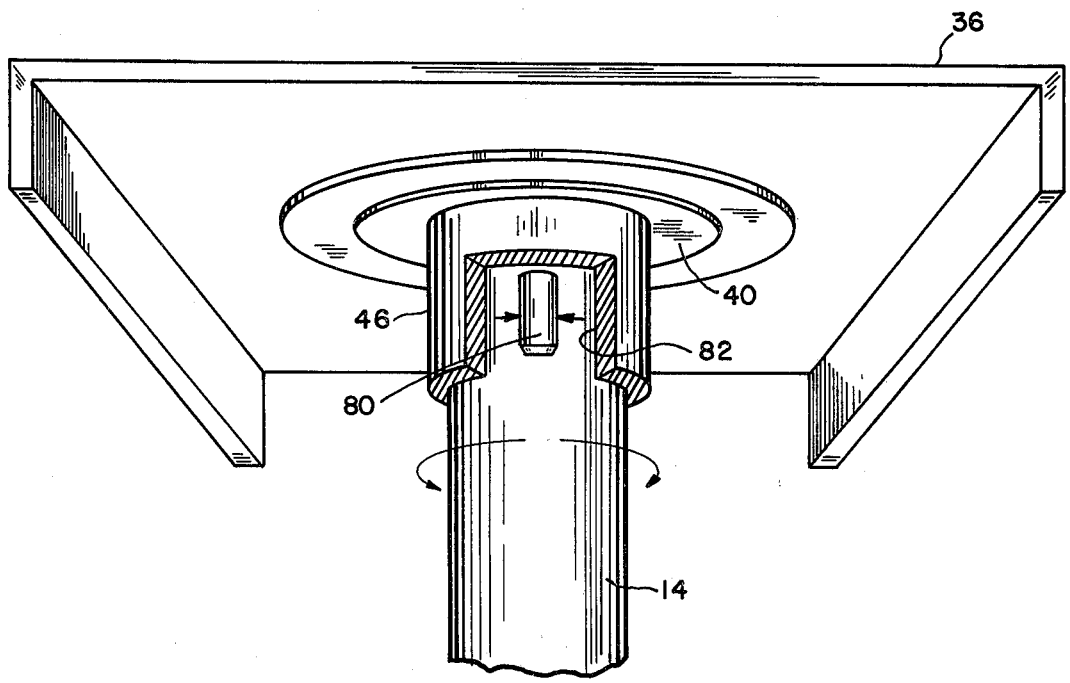

FIG. 6 is a side elevational view in cross-section showing the construction of an arrangement of the various elements associated with the rotatable mounting of the support platform to the support shaft and the provision of a circumferential shield to shield access to the point of rotatable mounting; and FIG. 7 is a side elevational view in cross-section showing the apertured support platform and the recesses provided therein in relationship to tamper proof screws which are carried within the recesses of the apertures for mounting a television receiver thereatop;

FIG. 8 is a side elevational view, partly in crosssection, showing another feature of the invention including the provision of a stop tab and cut out section in the circumferential shield to prevent the complete 360 degree rotational movement of the support platform assembly.

Referring now to FIGS. 1 and 2 of the drawings, the pedestal support generally referred to by the numeral 10 is illustrated in perspective view. As shown in FIG. 2, the structure includes a base plate 12 having an upstanding support 14 mounted thereon. The upstanding support 14 is tubular in configuration having a hollow interior. Also mounted on the base and upstanding therefrom is a support shaft 16 which is concentrically oriented with respect to the upstanding support 14. As more particularly shown in FIGS. 4 and 6 of the drawings, the upper end of the support shaft is screw threaded as shown at 18 to accomodate the mounting of the support platform assembly 20 thereatop.

It will further be noted that a sleeve member 22 is provided, the sleeve member 22 being substantially tubular in configuration and having an internal diameter slightly greater than the external diameter of the support shaft 16. The sleeve member 22 is slidably mounted over the support shaft 16 such that the same is freely rotatable thereabout as clearly indicated in FIG. 4 of the drawings. It is intended by this construction to permit the sleeve member 22 to rotate freely when contacted by any cutting member which cuts through the upstanding support 14 such that it is impossible to cut through the sleeve member 22 due to the rotational movement caused when contacted by the cutting member. This constitutes one novel feature of the present invention which renders the pedestal support 10 substantially theft-proof.

Figure 5:
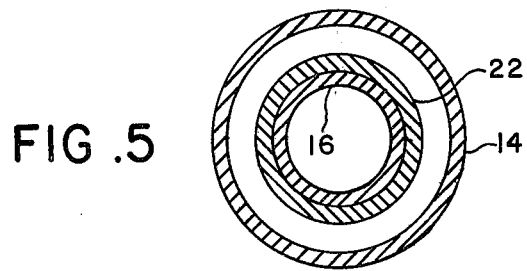
FIG. 5 is a cross-sectional view showing the concentric orientation and relationship between the upstanding support, support shaft, and rotatable sleeve member taken in the direction of the arrows along the line 5—5 of FIG. 4.

The concentric orientation of the upstanding support 14 with respect to the support shaft 16 and sleeve member 22 is shown in FIG. 5 of the drawings.

It will further be noted that the pedestal support 10 of the present invention is provided with a decorative slip-on column 24 which has a hollow interior 26 of sufficient size to accomodate the upstanding support 14 therethrough. In a preferred embodiment, a variety of decorative slip-on columns 24 may be provided and fashioned to complement any particular style of furniture or decor as desired by the purchaser. It will be noted from a view of FIG. 4 of the drawings that when assembling the subject pedestal support 10 the decorative slip-on column 24 is positioned around the upstanding support 14 prior to the installation of the support platform assembly 20. In this manner, the slip-on column 24 is firmly anchored in position such that the same is not removable by being interposed between the underlying support surface and the base plate 12 of the pedestal support 10 and the upper end is bounded by the support platform assembly 20.

Figure 4:
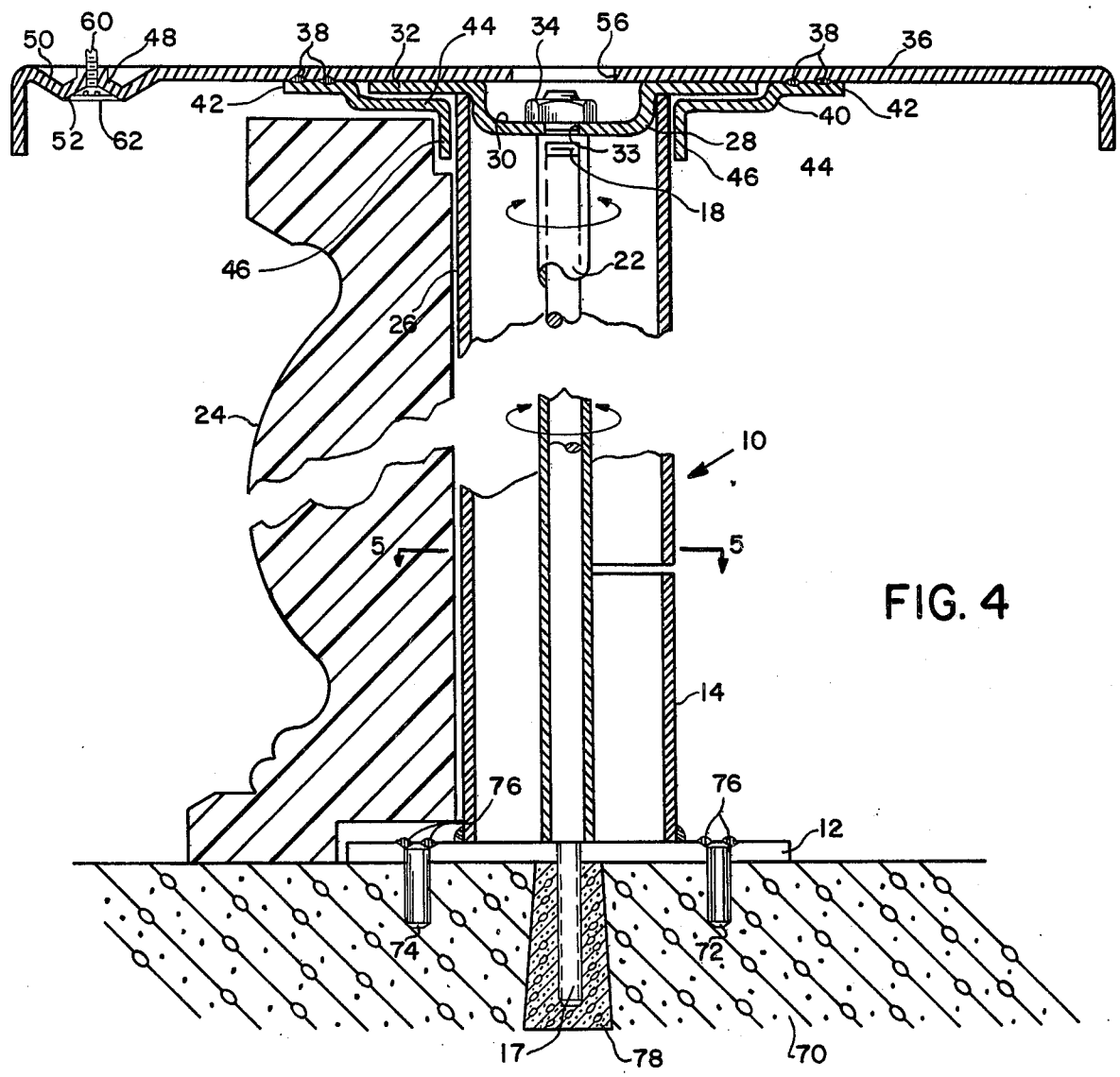
FIG. 4 is a side elevational view, in cross-section, showing the relationship between the various elements of the subject pedestal base assembly.

The details of construction of the support platform assembly are more particularly shown in FIGS. 4 and 6 of the drawings. The assembly 20 is shown to include a cup plate 28 which is formed by a cup portion 30 and bounded at its outer end by circumferential flange 32. The center portion of the cup plate 20 includes an aperture 33 which has a slightly greater diameter than the diameter of the threaded screw portion 18 of the support shaft 16 such that the support shaft 16 is insertable through the aperture 33 and the cup plate 28 is fixedly held in position by means of a threaded nut 34. A support platform 36 is provided having a circumferential shield member 40 mounted on the lower surface of the support platform 36 by any suitable means such as weldments 38. The support platform 36 rotatably rides on the outer circumferential flange 32 of the cup plate 28. A secure mounting of the support platform assembly 20 is achieved by trapping the outer circumferential flange 32 of the cup plate 28 between the lower surface of the support platform 36 and the circumferential shield member 40.

The shield member 40 is formed by a mounting flange 42 which amounts to the under surface of the support platform 36 by weldments 38, and extends inwardly to a recessed portion 44 which is recessed a sufficient distance to accomodate the positioning of the circumferential flange 32 as depicted in FIG. 6 of the drawings. The recessed portion 44 in turn terminates in a downwardly depending circumferential shield 46 which has an inner diameter slightly greater than the outer diameter of the upstanding support 14 such that the shield 46 is freely movable about the outer periphery of the upstanding support 14.

As shown in both FIGS. 4 and 6 of the drawings, the function of the circumferential shield member 40 is to shield access to the cup plate 28 which effectively carries and secures the platform assembly 20 to the support shaft 16. This feature is considered to be another novel aspect of the present invention in terms of providing a pedestal support 10 which is substantially tamper proof and greatly minimizes the possibility of unauthorized removal of a television receiver or other apparatus carried on the support platform 36. It will therefore be appreciated that the pedestal support 10 of the present invention not only permits ease of use in terms of providing a rotatably mounted support platform assembly 20, but furthermore greatly diminishes the opportunity for unauthorized removal of the support platform assembly 20 from the unstanding support 14.

An additional security feature of the present invention relates to the manner of mounting a television receiver or other apparatus onto the support platform 36. As shown in FIGS. 4 and 7 of the drawings, the support platform 36 is provided with a series of four apertures 48 which are formed by reverse crimps designated by the numeral 50 in the upper surface of the support platform 36. The apertures 48 are also provided with recesses 52 such that a threaded screw 60 having a screw head 62 may be conveniently nestled into the aperture 48 with the screw head 62 nestled within the recess 52. It is contemplated that the threaded screws 60 are of the tamper proof variety and require the use of a special tool to remove. It will therefore be appreciated that to mount a television receiver or other device atop the support platform 36 the tamper proof screws 60 are interted through the apertures 48 and into the bottom casing of the television receiver. The function of the reverse crimps 50 is to prevent unauthorized removal of the threaded screws 60 by any shearing tool such as a cold chisel. The crimps 50 will deflect the tool when an attempt is made to shear off the screw heads 62. In addition, the reverse crimps 50 render it impossible to twist the heads of the screws 60 with pliers to remove the same. Since a special tool is required in order to remove the screws 60 it will be appreciated that an additional security feature is provided in connection with this invention.

It will further be observed from FIG. 4 of the drawings that the subject pedestal support 10 of the present invention is designed to be installed either as original equipment during the construction phase of a given facility, or as add-ons to an existing structure. It will be noted in FIG. 4 of the drawings that the underlying support surface is depicted as a concrete floor 70 and that the base plate 12 is fixedly secured to the concrete floor 70 by means of a high force anchor 78 which is set into a drilled hole in the concrete floor 70. The anchor 78 is then expanded with a special tool as is known in the art. The lower end of the support shaft 16 is then set in the anchor 78 thus holding the support shaft firmed to the concrete floor 70. Base pins 72 and 74 are then installed through the base plate 12 into appropriate holes drilled into the floor 70 and function to prevent rotation of the base plate 12 once installed. The anchor 78 provides a 15,000 pound hold down force thereby providing a very secure installation to the floor 70. In the event that it is desired to remove the pedestal support 10, the entire structure may be removed including the base plate 12 leaving only the anchor 78 in the floor 70. The support shaft 16 is removed at floor level by any suitable means. It will therefore be appreciated that incident to the construction of a motel or hotel facility, a pedestal support 10 of the present invention may be installed as new or add-on equipment within each room facility providing a very secure and substantially theft-proof support for a television receiver.

From the above description, it will be clearly understood that the pedestal support 10 of the present invention provides at least three aspects which are considered to be of a high security nature, these including the provision of the rotatable sleeve member 22 mounted about the support shaft 16 thereby preventing any unauthorized person from utilizing a cutting instrument to cut through the upstanding support 14 since once contact is made between the cutting element and the rotatable sleeve member 22, the sleeve member 22 will tend to merely rotate with the reciprocating action of the cutting member and cannot be cut. Furthermore, the provision of the circumferential shield member 40 shields access to the mounting of the cup plate 28 onto the support shaft 16, while at the same time still permitting the rotational movement of the support platform assembly 20. Another security feature of the present invention relates to the apertures 48 formed by reverse crimp 50 in the support platform 36 which accomodates the insertion of a tamper proof threaded screw 60 therein, with the apertures 48 provided with recesses 52 to accomodate the screw head 62 therein. As indicated previously, it is contemplated that threaded screws 60 of the tamper proof variety which would require a special instrument to remove may be conveniently employed thereby further insuring against any unauthorized removal of the television receiver from atop the platform 36. Finally, as indicated above, the complete pedestal support 10 may be fixedly secured to the underlying surface of the structure, such as a concrete floor 70 during the construction phase of the building. Not only does this feature provide additonal security, but it further provides rigidity and added strength for carrying any size or weight television receiver as desired by the operator of the facility.

With reference to FIG. 8 of the drawings, it will be observed that another feature of the invention is the provision of a stop-tab 80 mounted on the outer surface of the upstanding support 14. The circumferential shield 46 is provided with a cut out portion 47 and positioned to stradle the stop tab 80 such that the stop tab 80 will abut against the opposed edges of the cut out portion 47. In this manner the complete 360 degree rotational movement of the support platform assembly 20 is prevented by means of the stop tab 80 abutting against the opposed edges of the cut out portion 47 and hence, prevents the entanglement of cords and the like around the upstanding support 14. In addition, this feature permits the mounting of the entire pedestal support closer to the wall of the room since 360 degree rotational movement is prevented, and hence preventing the support platform assembly from striking against the wall surface.

Another advantage of the present invention is the fact that the decorative slip-on column 24 may be formed to coordinate with any desired furniture style or style of decor and thereby provides the operator of the facility with flexability in terms of coordinating all of the furnishings of each of the rooms. Insofar as the decorative slip-on column 24 is concerned, it is contemplated that this element may be formed of any suitable material such as foam plastic or the like in order to minimize the cost while providing a wide variety of decor styles for the benefit of the operator.

Insofar as the remaining portions of the pedestal support 10 are concerned it is contemplated that the upstanding support 14, support shaft 16 and sleeve member 22 may be formed of any metallic material, and it is contemplated that hardened steel would be an appropriate material to further minimize the danger of unauthorized removal by the utilization of a cutting element. Similarly, the circumferential shield member 40 as well as the cup plate 28 may be formed of any steel material or steel alloy in order to provide rigidity and support for the apparatus to be carried on the support platform 36. The support platform 36 may be formed of a metallic material or alternatively, may be formed of a plastic material, although from the standpoint of high security, the metallic material is preferred since it is more difficult to cut into or break a metallic material than it is to rupture plastic. However, high strength plastics are known, and it is within the scope of the present invention that the support platform 36 be formed of any appropriate high strength material.

It will be noted from a view of FIG. 3 of the drawings, a lock washer 54 is interposed between the threaded nut 34 and the upper surface of the cup portion 30 incident to the cup plate 28. Furthermore, access to the threaded nut 34 may be had through the support platform 36 through an aperture 56 positioned centrally in the support platform 36. It will be appreciated that the aperture 56 is completely covered when the television receiver is positioned atop the support platform 36 and is screw threadedly mounted in position. Hence, unauthorized personnel cannot gain access to the support platform assembly 20 or to the threaded nut 34 with the television receiver appropriately positioned and screw threadedly mounted thereon.

It will be appreciated from the above description of the invention that the pedestal base of the present invention is equally applicable to a variety of apparatus to be carried thereatop. For example, it is contemplated that the subject invention may be used for carrying postage stamp vending machines, parking meters, or any other device where unauthorized removal is to be prevented. Hence, it is contemplated that the scope of the invention as defined in the appended claims cover the invention regardless of the apparatus to be carried atop the support platform.

It will be appreciated by virtue of the above description that the present invention provides a high security pedestal support especially adapted for carrying television receivers in such institutions as motels, hotels, or any other commercial institutions where such devices are provided for the convenience of the consuming public who are the guests of the institutions. The novel pedestal support provides at least three areas of security in that the pedestal base resists tampering by means of a cutting element, by the provision of a totatable sleeve member positioned about the central support shaft, as well as by providing a circumferential shield member to conceal access to the rotatable mounting of the support platform atop the support shaft. In addition, the manner of screw threading the television receiver to the support platform in such as to minimize the danger of unauthorized removal since special tools would be required in order to break the threaded screws to gain access to the television receiver. In addition, the base of the pedestal may be mounted directly to the underlying support surface which in new construction generally consists of concrete in a manner which prevents the pedestal support from being entirely removed from the premises. Finally, the pedestal support of the present invention further permits the use of a decorative slip-on column which permits the owner or operator of the institution to provide an aesthetic effect with respect to the decor of the facility in which the subject pedestal support is positioned.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. A high security pedestal base for supporting a variety of apparatus there atop, comprising in combination, a base, an upstanding support mounted on said base, said upstanding support having at least a partial hollow interiorly thereof, a support shaft positioned interiorly of said upstanding support within said hollow and mounted on said base, support platform means for supporting said apparatus mounted on said support shaft and extending outwardly beyond the periphery of said upstanding support, with a cup plate having an outwardly extending circumferential flange and having a central aperture positioned in the cup portion thereof, said cup plate being engageably mounted on said support shaft, said support platform means being rotatably mounted on said cup plate and adapted to carry a variety of apparatus thereon, and said support platform means further including a circumferential shield mounted on the lower surface thereof and extending downwardly therefrom along the outer surface of said upstanding support to conceal access to said cup plate when said support platform is mounted in position atop said support shaft, said circumferential shield including a recessed portion entrapping said circumferential flange of said cup plate between the lower surface of said support platform means and said recessed portion thereby to securely engage said support platform means to said upstanding support and support shaft, and a sleeve member carried about the outer periphery of said support shaft and freely rotatable thereabout, whereby said rotatable sleeve member inhibits the unauthorized cutting through said base by freely rotating in response to the reciprocating action of any cutting member making contact therewith.

2. The pedestal base as set forth in claim 1 above, wherein said support shaft and sleeve member are tubular in construction and wherein the internal diameter of said sleeve member is slightly greater than the external diameter of said support shaft.

3. The pedestal base as set forth in claim 1 above, wherein said device further includes a docorative slip-on column having a hollow interior and adapted to be positioned around said upstanding support with said upstanding support extending through said hollow portion of said slip-on column and wherein said support platform means overlies the top portion of said slip-on column.

4. The pedestal base as set forth in claim 1 above wherein said base is adapted for fixed mounting to an underlying support surface.

5. The pedestal base as set forth in claim 1 above, wherein said support shaft includes a lower mounting portion, said lower mounting portion extending through said base and adapted for insertion into an underlying support surface to further rigidity the said support shaft and to provide a greater degree of security therefor.

6. The pedestal base as set forth in claim 1 above, wherein said support platform means further includes a plurality of apertures positioned about the outer circumferential edges thereof and a series of tamper proof screws are provided through said apertures thereby to secure an apparatus carried on the upper surface of said support platform means in tamper proof engagement therewith.

7. The pedestal base as set forth in claim 6 above, wherein said support platform means is provided with a series of four of said apertures to accomodate four tamper proof screws.

8. The pedestal base as set forth in claim 7 above, wherein each of said four apertures are recessed and wherein said tamper proof screws include screwheads which may be nestled within said recessed portion of said apertures.

9. The pedestal base as set forth in claim 1 above, wherein said upstanding support is provided with a stop tab mounted thereon and extending outwardly therefrom for a short distance, and said circumferential shield includes a cut out portion overlaying on either side of said stop tabs such that said cut out portion and stop tab cooperate to form stop positions for the circumferential rotational movement of said support platform means assembly thereby preventing complete 360° rotational movement thereof.

* * * * *